(12) United States Patent
Tu

(10) Patent No.: US 11,104,584 B2
(45) Date of Patent: Aug. 31, 2021

(54) HYDROPHOBIC AND OLEOPHOBIC NANOCOMPOSITE MATERIAL, METHOD FOR MAKING SAME, AND ENCAPSULATING STRUCTURE UTILIZING SAME

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Yu-Chieh Tu, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 226 days.

(21) Appl. No.: 16/442,961

(22) Filed: Jun. 17, 2019

(65) Prior Publication Data

US 2020/0325033 A1    Oct. 15, 2020

(30) Foreign Application Priority Data

Apr. 11, 2019 (CN) .......................... 201910289163.9

(51) Int. Cl.
*C01G 23/047* (2006.01)
*B01J 21/06* (2006.01)
(Continued)

(52) U.S. Cl.
CPC .......... *C01G 23/047* (2013.01); *B01J 21/063* (2013.01); *B29C 66/02245* (2013.01);
(Continued)

(58) Field of Classification Search
CPC ....... C01G 23/047; B01J 21/063; C09J 11/04; C09J 2400/16; C09J 2301/408;
(Continued)

(56) References Cited

U.S. PATENT DOCUMENTS

2010/0189940 A1\* 7/2010 Grothe ..................... C08K 9/04
428/35.8

FOREIGN PATENT DOCUMENTS

CN           105820605 B  \* 11/2017  ............... C09D 1/00
WO     WO-2018106912 A1  \*  6/2018  ............... A61K 6/62

OTHER PUBLICATIONS

Fang et al., "Fluorine-Doped Porous Single-Crystal Rutile TiO2 Nanorods for Enhancing Photoelectrical Water Splitting", Chem. Eur. J. 20, 11439-11444 (2014) (Year: 2014).\*

\* cited by examiner

*Primary Examiner* — Scott R. Walshon
(74) *Attorney, Agent, or Firm* — ScienBiziP, P.C.

(57) ABSTRACT

A method for making an oil- and water-resistant nanocomposite material includes preparing F-doped $TiO_2$ nanorods, dispersing the F-doped $TiO_2$ nanorods into a transparent adhesive to obtain a nanocomposite adhesive, and treating a surface of the nanocomposite adhesive to roughen the surface and expose some of the F-doped $TiO_2$ nanorods. A transparent nanocomposite material suitable for use as transparent packaging for example is thereby obtained. The present disclosure also provides the nanocomposite material, and an encapsulating structure using the nanocomposite material.

12 Claims, 3 Drawing Sheets

(51) Int. Cl.
*C09J 11/04* (2006.01)
*B29C 65/00* (2006.01)
*C08K 9/04* (2006.01)
*C08K 3/22* (2006.01)
*B82Y 30/00* (2011.01)
*B82Y 40/00* (2011.01)

(52) U.S. Cl.
CPC ................ *C08K 9/04* (2013.01); *C09J 11/04* (2013.01); *B82Y 30/00* (2013.01); *B82Y 40/00* (2013.01); *C01P 2002/54* (2013.01); *C01P 2004/16* (2013.01); *C01P 2004/64* (2013.01); *C08K 2003/2241* (2013.01); *C09J 2400/16* (2013.01)

(58) Field of Classification Search
CPC .. C08K 2003/2241; C08K 9/04; B82Y 30/00; B82Y 40/00; C01P 2002/54; C01P 2004/64; C01P 2004/16
See application file for complete search history.

HYDROPHOBIC AND OLEOPHOBIC NANOCOMPOSITE MATERIAL, METHOD FOR MAKING SAME, AND ENCAPSULATING STRUCTURE UTILIZING SAME

FIELD

The subject matter herein generally relates to nanocomposites as packaging materials.

BACKGROUND

Transparent packaging materials are used for devices such as e-books, flexible displays, and flexible solar cells. However, water and/or oil can reduce the transparency and therefore affecting the functions of such packaging. Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
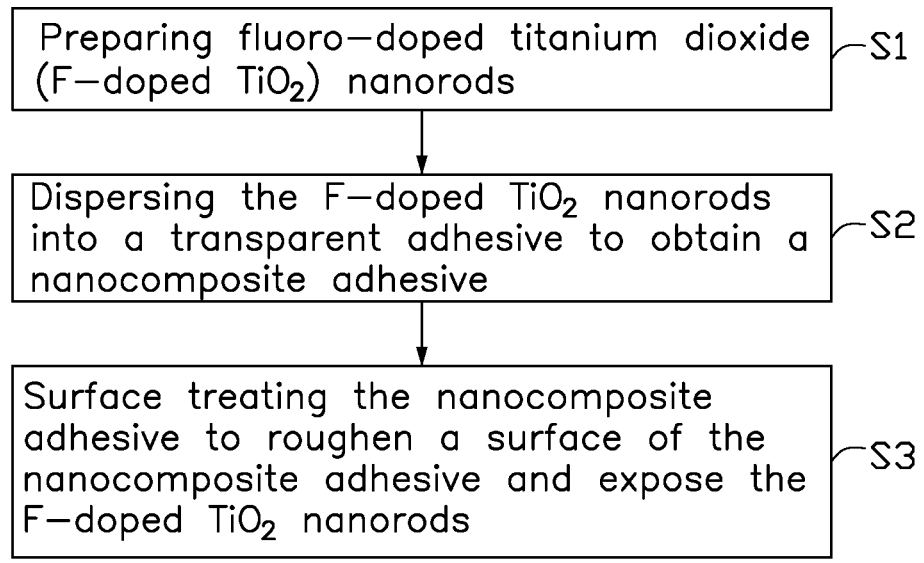
FIG. 1 is a flow chart of a method for making an oil- and water-resistant nanocomposite material.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

Referring to FIG. 1, a flowchart of a method for making an oil- and water-resistant nanocomposite material in one embodiment is disclosed. The method is provided by way of embodiment, as there are a variety of ways to carry out the method. The method described below can be carried out using the configurations illustrated in FIG. 2 for example, and various elements of these figures are referenced in explaining the method. Each block shown in FIG. 1 represents one or more processes, methods, or subroutines, carried out in the method. Additionally, the illustrated order of blocks is by example only and the order of the blocks can change. The method can begin at Block S1.

Figure 2:
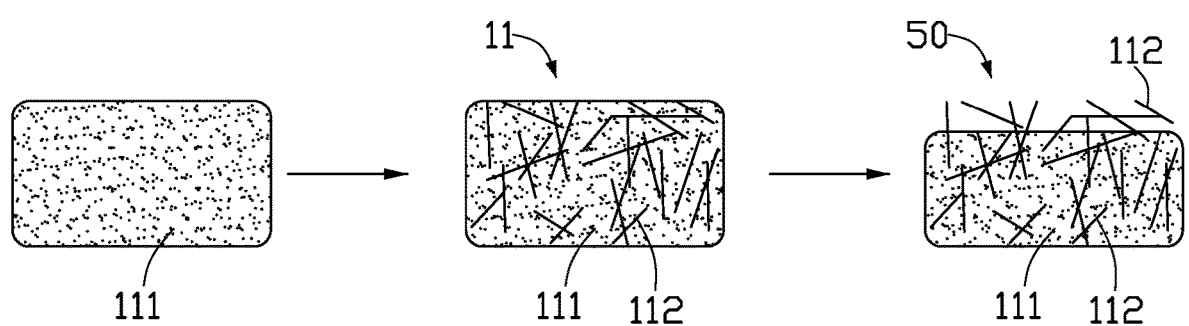
FIG. 2 is a view of semi-finished oil- and water-resistant nanocomposite material in each manufacturing block in the method of FIG. 1.

Referring to FIGS. 1 and 2, a method for preparing a nanocomposite 10 according to an embodiment of the present disclosure includes:

Block S1: preparing fluoro-doped titanium dioxide (F-doped $TiO_2$) nanorods 112.

Block S2: dispersing the F-doped $TiO_2$ nanorods 112 into a transparent adhesive 111 to obtain a nanocomposite adhesive 11.

Block S3: surface treating the nanocomposite adhesive 11 to roughen a surface of the nanocomposite adhesive 11 and expose some F-doped $TiO_2$ nanorods 112 to obtain a transparent nanocomposite 10.

In one embodiment, the F-doped $TiO_2$ nanorods 112 are prepared by a sol-gel process.

In one embodiment, before preparing the F-doped $TiO_2$ nanorods 112 by the sol-gel process, the method further includes preparing a hydrolyzed 1H,1H,2H,2H-perfluorodecyl trimethoxysilane (PFDTMES) solution. The PFDTMES, also known as heptafluorodecyltrimethoxysilane, has a molecular formula of $C_{13}H_{13}F_{17}O_3Si$, and its chemical structure is as follows:

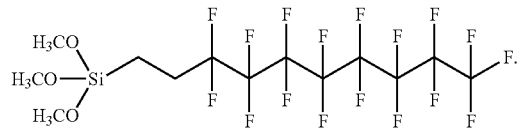

In one embodiment, preparation of the hydrolyzed PFDTMES includes: mixing distilled water, ethanol, and acetic acid to obtain an acidic ethanol solution; then adding the PFDTMES into the acidic ethanol solution to obtain a mixture solution of the acidic ethanol solution and the PFDTMES solution. The mixture solution is stirred at room temperature to hydrolyze the PFDTMES. Then, the hydrolyzed PFDTMES solution is obtained. Specifically, 3 ml of distilled water is added into 100 ml of ethanol (purity of 99.5%) to prepare the ethanol solution. Then, an appropriate amount of acetic acid (purity of 99.5%) is added to the ethanol solution to adjust its pH value to 2.8. 2 ml of PFDTMES solution is then added into the acidic ethanol solution to obtain a mixed solution of the acidic ethanol solution and the PFDTMES solution. The mixture solution is stirred for 30 minutes at room temperature to obtain the hydrolyzed PFDTMES. In this process, the equation for the chemical reaction is:

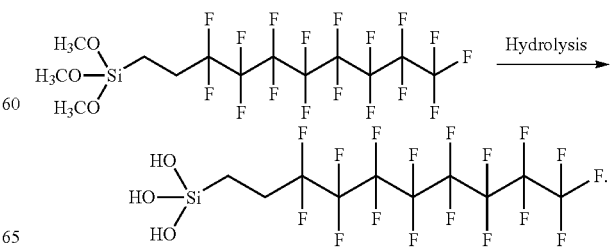

In one embodiment, after the preparation of the hydrolyzed PFDTMES solution, a sol-gel process is used to synthesize the F-doped TiO$_2$ nanorods. The sol-gel process selects a precursor, a surfactant, and a catalyst. The precursor of TiO$_2$ is titanium isopropoxide (TTIP), the surfactant is oleic acid (OA), and the catalyst is trimethylamine N-oxide dehydrate (TMAO).

Specifically, the TiO$_2$ nanorods were synthesized by the sol-gel process in a ratio of 0.02 to 0.05 by weight of TTIP and OA by using 10 g of TMAO as catalyst. For the synthesis of F-doped TiO$_2$ nanorods 112, the same sol-gel process is used but 1 ml of hydrolyzed PFDTMES solution is added, and then reacted at 80° C. to 100° C. for 10 hours to 15 hours while being stirred.

In one embodiment, the weight percentages of TTIP and OA are, for example, 0.02, 0.03, 0.04, 0.05, and the like.

In one embodiment, TTIP, OA, TMAO, and hydrolyzed PFDTMES solution are mixed and stirred at such temperature, as for example, 80° C., 85° C., 90° C., 95° C., or 100° C. The stirring may be applied for, for example, 10 hours, 11 hours, 12 hours, 13 hours, 14 hours, or 15 hours.

A length of each F-doped TiO$_2$ nanorod 112 is not more than 30 nanometers, and a diameter of each F-doped TiO$_2$ nanorod 112 is not more than 5 nanometers. In the reactions for F-doped TiO2 nanorods, TTIP and OA react first to obtain a titanate eater. The chemical equation is:

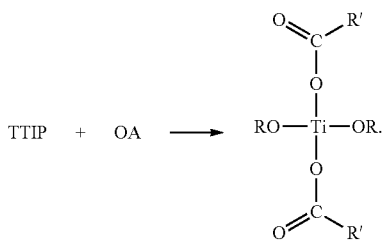

Then, the titanate eater is condensed with hydrolyzed PFDTMES to form F-doped TiO$_2$ nanorods. The chemical equation is:

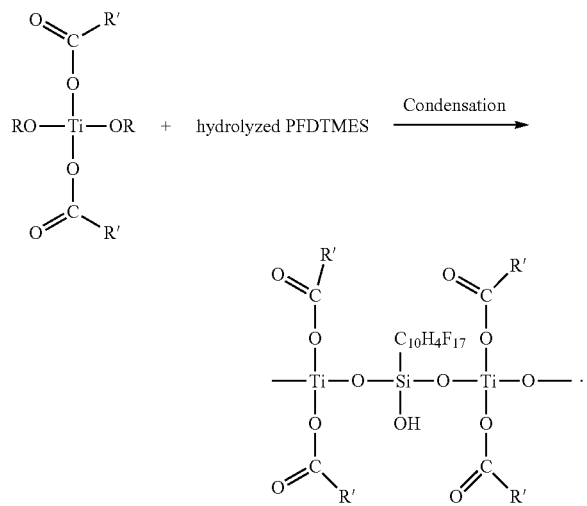

In one embodiment, the transparent adhesive 111 may be an acrylate adhesive (8106 adhesive). Compositions (wt. %) of the acrylate adhesive are: urethane acrylic oligomer 50%, N-vinyl-2-pyrrolidone 10%, photoinitiator 1%, silane couple agent 9%, hydroxyethylmethylacrylate 15%, and acrylamide 15%.

In one embodiment, a weight percentage of F-doped TiO$_2$ nanorods 112 accounts for approximately 8.5 wt. % to approximately 12 wt. % in the transparent adhesive 111. The stirring may be for 20 hours to 30 hours at a room temperature in a protective gas atmosphere, for example, an argon atmosphere. Thereby, the nanocomposite adhesive 11 is obtained.

In one embodiment, the weight percentage of the F-doped TiO$_2$ nanorods 112 may be, for example, 8.5 wt. %, 9 wt. %, 10 wt. %, 11 wt. %, and 12 wt. %, and the like.

In one embodiment, after dispersing the F-doped TiO$_2$ nanorods 112 into the transparent adhesive 111 in Block S2, the stirring time within the protective gas atmosphere at room temperature may be, for example, 20 hours, 24 hours, 25 hours, and 30 hours, and the like.

In one embodiment, Block S3 uses oxygen plasma to treat the surface of the nanocomposite adhesive 11. The oxygen plasma roughens the surface of the nanocomposite adhesive 11 and exposes some F-doped TiO$_2$ nanorods 112 to obtain the nanocomposite 10. In other embodiments, the surface of the nanocomposite adhesive 11 may be plasma treated with a gas such as carbon dioxide, argon, ammonia, or nitrogen. Alternatively, other surface treatment techniques may be used to roughen the surface of the nanocomposite adhesive 11 and expose some of the F-doped TiO$_2$ nanorods 112.

The method for preparing the nanocomposite 10 combines a nanotexture rough surface with low surface tension to possess hydrophobic and oleophobic properties simultaneously. In the method, some of the F-doped TiO$_2$ nanorods 112 are exposed by plasma treatment, so that the nanocomposite 10 has a nano texture rough surface. In addition, since the fluorine atom has a small atomic radius and maximum electronegativity, the fluorine element effectively reduces the surface energy. Since the exposed F-doped TiO$_2$ nanorods 112 of the nanocomposite 10 are fluorine-based materials, the nanocomposite 10 has a low surface tension. Therefore, the nanocomposite 10 combines a nanotexture rough surface with low surface tension to possess the hydrophobic and oleophobic properties.

A nanocomposite 10 prepared by the method is also provided. The nanocomposite 10 comprises transparent adhesive 111 and F-doped TiO$_2$ nanorods 112 dispersed in the transparent adhesive 111. Some of the F-doped TiO$_2$ nanorods 112 are exposed from the surface of the transparent adhesive 111. The nanocomposite 10 combines a nanotexture rough surface with low surface tension for hydrophobic and oleophobic properties.

In the nanocomposite 10, the F-doped TiO$_2$ nanorods 112 are inorganic materials, and the transparent adhesive 111 is an organic polymer. Therefore, the nanocomposite 10 has the advantages of good mechanical properties of an inorganic material together with the flexibility and light weight of an organic material.

In one embodiment, the transparent adhesive 111 is an acrylate adhesive. A weight percentage of the F-doped TiO$_2$ nanorods 112 in the nanocomposite 10 is from approximately 8.5 wt. % to approximately 12 wt. %. A length of each F-doped TiO$_2$ nanorod 112 is not more than 30 nanometers, and a diameter of each F-doped TiO$_2$ nanorod is not more than 5 nanometers. In one embodiment, the weight percentage of the F-doped TiO$_2$ nanorods 112 may be, for example, 8.5 wt. %, 9 wt. %, 10 wt. %, 11 wt. %, and 12 wt. %, and the like.

Figure 3:
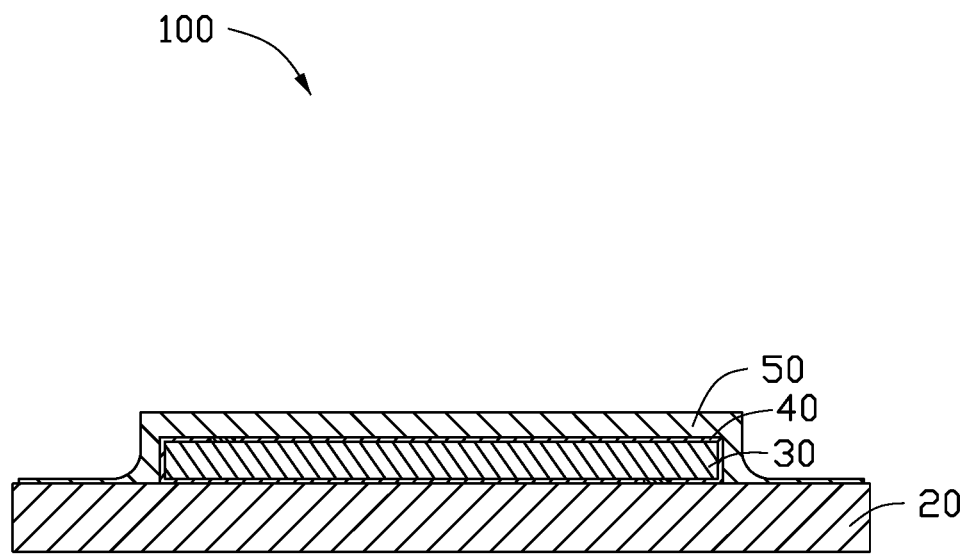
FIG. 3 is a cross-sectional view of an encapsulating structure for the nanocomposite material.

As shown in FIG. 3, an encapsulating structure 100 is also provided. The encapsulating structure 100 includes a substrate 20, a device 30 on a surface of the substrate 20, and an encapsulating film 50. The encapsulating film 50 covers the device 30 and extends over the substrate 20 to encapsulate the device 30 onto the substrate 20. The encapsulating film 50 is formed by the nanocomposite 10, and the F-doped $TiO_2$ nanorods are exposed from the outermost surface of the encapsulating film 50.

In one embodiment, the device 30 may be an e-book, a flexible display, a flexible solar cell, or the like. The substrate 20 may be a flexible substrate such as PET.

In one embodiment, the substrate 20 may be a metal core printed circuit board (MCPCB). The encapsulating structure 100 further includes an electrode 40 electrically connecting the substrate 20 and the device 30. The package film 50 covers the electrode 40 and the device 30 and extends over the substrate 20 to encapsulate the electrode 40 and the device 30 together on the substrate 20.

The encapsulating structure 100 using the nanocomposite 10 exhibits the same hydrophobic and oleophobic properties as the nanocomposite 10.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A method for making a nanocomposite material, comprising:
   preparing fluoro-doped titanium dioxide (F-doped $TiO_2$) nanorods;
   dispersing the F-doped $TiO_2$ nanorods into a transparent adhesive to obtain a nanocomposite adhesive; and
   surface treating the nanocomposite adhesive to roughen a surface of the nanocomposite adhesive and expose the F-doped $TiO_2$ nanorods.

2. The method according to claim 1, wherein the F-doped $TiO_2$ nanorods are prepared by a sol-gel process.

3. The method according to claim 2, wherein the sol-gel process for preparing the F-doped $TiO_2$ nanorods selects a precursor, a surfactant, and a catalyst, the precursor is titanium isopropoxide (TTIP), the surfactant is oleic acid (OA), and the catalyst is trimethylamine N-oxide dehydrate (TMAO).

4. The method according to claim 3, before preparing the F-doped $TiO_2$ nanorods, further comprising preparing a hydrolyzed 1H,1H,2H,2H-perfluorodecyl trimethoxysilane (PFDTMES) solution.

5. The method according to claim 4, wherein preparing the hydrolyzed PFDTMES solution comprises: mixing distilled water, ethanol, and acetic acid to obtain an acidic ethanol solution; adding the PFDTMES solution to the acidic ethanol solution to obtain a mixture solution of the acidic ethanol solution and the PFDTMES solution; and stirring the mixture solution at room temperature to hydrolyze the PFDTMES.

6. The method according to claim 1, wherein surface treating the nanocomposite adhesive comprises treating surfaces of the nanocomposite adhesive by plasma.

7. A nanocomposite material, comprising:
   a transparent adhesive; and
   fluoro-doped titanium dioxide (F-doped $TiO_2$) nanorods dispersed in the transparent adhesive, wherein some of the F-doped $TiO_2$ nanorods are exposed from a surface of the transparent adhesive.

8. The nanocomposite according to claim 7, wherein a weight percentage of the F-doped $TiO_2$ nanorods in the nanocomposite is from approximately 8.5 wt. % to approximately 12 wt. %.

9. The nanocomposite according to claim 7, wherein a length of each of the F-doped $TiO_2$ nanorods is not more than 30 nanometers and a diameter of each of the F-doped $TiO_2$ nanorods is not more than 5 nanometers.

10. A encapsulating structure, comprising:
    a substrate;
    a device on a surface of the substrate; and
    an encapsulating film covering the device and extending to partially cover the substrate to encapsulate the device on the substrate, wherein the encapsulating film is made of a nanocomposite material, the nanocomposite material comprises transparent adhesive; and fluoro-doped titanium dioxide (F-doped $TiO_2$) nanorods dispersed in the transparent adhesive, and some of the F-doped $TiO_2$ nanorods are exposed from the surface of the encapsulating film away from the device and the substrate.

11. The encapsulating structure according to claim 10, wherein a weight percentage of the F-doped $TiO_2$ nanorods in the nanocomposite is from approximately 8.5 wt. % to approximately 12 wt. %.

12. The encapsulating structure according to claim 10, wherein a length of each of the F-doped $TiO_2$ nanorods is not more than 30 nanometers and a diameter of each of the F-doped $TiO_2$ nanorods is not more than 5 nanometers.

\* \* \* \* \*